Patented June 24, 1930

1,767,382

UNITED STATES PATENT OFFICE

OTTO LEUCHS, OF ELBERFELD, GERMANY, ASSIGNOR TO I. G. FARBENINDUSTRIE AKTIENGESELLSCHAFT, OF FRANKFORT-ON-THE-MAIN, GERMANY

PROCESS FOR THE CONVERSION OF DIFFICULTLY SOLUBLE OR INSOLUBLE CARBOHYDRATE ETHERS INTO A SOLUBLE STATE

No Drawing. Application filed June 24, 1926, Serial No. 118,373, and in Germany June 27, 1925.

In the manufacture of ethers of colloidal carbohydrate, particularly of cellulose ethers or their transformation products, products are obtainable according to the method of working, which possess either a relatively good solubility or which are difficultly soluble or insoluble.

The present invention concerns a process for the conversion of such difficultly soluble or insoluble products into products possessing a relatively good solubility by the use of depolymerizing or degrading agents. This process is carried out by utilizing the action of acids, such as hydrochloric acid, sulfuric acid, phosphoric acid, oxalic acid, a mixture of zinc chloride and hydrochloric acid and the like, or other substances exerting a degrading or hydrolytic action. At the same time suitable additions may be made, particularly of such compounds, which act on the respective ethers in a manner causing a solvent or swelling action.

The proportions of acid with respect to the cellulose ether can be varied within very wide limits.

The following examples serve to illustrate my invention:—

Example 1.

1 part by weight of an ethyl cellulose, having a content of ethoxy group of 47 to 48%, which only undergoes swelling in benzene or in a mixture of alcohol and benzene, is introduced into a mixture of 3 volumes of alcohol, 3 volumes of water and 1½ volumes of concentrated sulphuric acid and thoroughly stirred. At first the mass simply swells up, but after a longer or shorter time, depending on the temperature of the mixture—for example at room temperature in the space of several hours—complete solution is effected. At this point, advantageously after a previous test precipitation, the solution is precipitated with water and the product is washed and dried. After this treatment the cellulose ether has become readily soluble in benzene and benzene-alcohol. From the solutions in these solvents films are obtainable possessing normal clearness, strength and pliability and completely equal to those obtained from the known soluble cellulose ethers. By prolonging the action of the acid (12–24 hours) the solubility is increased more and more, viscosity of the solutions of the product decreasing with increase of solubility.

Example 2.

1 part by weight of ethyl cellulose, as described in Example 1 is treated with about 10 parts by weight of glacial acetic acid, containing for example 0.1% of sulphuric acid. The further treatment is then effected as described in Example 1.

I claim:—

1. The process which comprises treating a difficultly soluble ether of a colloidal carbohydrate, in the presence of an agent exerting a swelling action upon the ether, with an acid in sufficient quantity to produce a degradation of the ether.

2. The process which comprises treating a difficultly soluble ether of a colloidal carbohydrate, in the presence of an agent exerting a swelling action upon the ether, with strong inorganic acid in sufficient quantity to produce a degradation of the ether.

3. The process which comprises treating a difficultly soluble ethyl ether of cellulose with a mixture of ethyl alcohol, and concentrated sulfuric acid in sufficient quantity to produce a degradation of the ether.

4. The process which comprises treating about one part by weight of a difficultly soluble ethyl ether of cellulose with a solution of about 1.5 parts by weight of concentrated sulfuric acid in about 3 parts by volume of alcohol and 3 parts by volume of water until solution is effected.

5. The process which comprises treating about one part by weight of an ethyl ether of cellulose containing approximately 47 to 48% of ethoxyl groups with a solution of about 1.5 parts by weight of concentrated sulfuric acid in about 3 parts by volume of alcohol and 3 parts by volume of water until solution is effected, thereafter diluting the solution and filtering and drying the precipitated cellulose compound.

In testimony whereof I have hereunto set my hand.

OTTO LEUCHS.